United States Patent [19]

Cooper

[11] Patent Number: 5,435,987
[45] Date of Patent: Jul. 25, 1995

[54] PROCESS FOR PREPARING AMMONIUM ZEOLITES OF LOW ALKALI METAL CONTENT

[75] Inventor: David A. Cooper, Morrisville, Pa.

[73] Assignee: PQ Corporation, Valley Forge, Pa.

[21] Appl. No.: 94,737

[22] Filed: Jul. 22, 1993

[51] Int. Cl.$^6$ ............................................. C01B 39/20
[52] U.S. Cl. ........................... 423/700; 423/DIG. 21; 502/86
[58] Field of Search ............... 423/700, 713, DIG. 21; 502/79, 86

[56] References Cited

U.S. PATENT DOCUMENTS

| | | | |
|---|---|---|---|
| 2,617,712 | 11/1958 | Bond | 502/86 X |
| 3,595,611 | 7/1971 | McDaniel et al. | 423/DIG. 21 X |
| 3,607,043 | 9/1971 | McDaniel et al. | 423/DIG. 21 X |
| 3,677,698 | 7/1972 | Sherry et al. | 502/79 X |
| 3,679,604 | 7/1972 | Lee et al. | 423/713 X |
| 3,969,276 | 7/1976 | Rosback | 502/79 |
| 4,069,172 | 1/1978 | Kanaoka et al. | 502/68 |
| 4,224,188 | 9/1980 | Alafandi et al. | 423/DIG. 21 X |
| 4,265,788 | 5/1981 | Ebitani et al. | 502/79 |
| 4,393,082 | 7/1983 | White et al. | 426/2 |
| 4,922,039 | 5/1990 | Yamada et al. | 570/211 |

OTHER PUBLICATIONS

Sherry "The Ion Exchange Properties of Zeolites. I Univalent Ion Exchange in Synthetic Faujasite" J. Phys. Chem. vol. 70 No. 4 Apr. '66.

*Primary Examiner*—Mark L. Bell
*Assistant Examiner*—David R. Sample
*Attorney, Agent, or Firm*—Ernest G. Posner

[57] ABSTRACT

Ammonium zeolites of extremely low alkali metal content are prepared by a process of potassium ion exchange followed by ammonium ion exchange. Zeolite X or zeolite Y that contain a significant amount of sodium are contacted with a potassium salt solution under conditions that provide a substantial exchange of potassium for sodium. The potassium enriched zeolite is then contacted with an ammonium salt solution so that the ammonium ion replaces the sodium and potassium ions. The resulting ammonium zeolite X or Y contains considerably less than 1% alkali metal calculated as $Na_2O$.

1 Claim, No Drawings

PROCESS FOR PREPARING AMMONIUM ZEOLITES OF LOW ALKALI METAL CONTENT

BACKGROUND OF THE INVENTION

This invention relates to the ion exchange of zeolites and provides a process for preparing ammonium zeolites of extremely low alkali metal content. In particular, the process involves ion exchange of a zeolite usually containing a significant amount of sodium to a potassium enriched form of the zeolite. Contact with an ammonium salt solution then provides the ammonium form zeolite with low alkali metal content.

Most zeolites (crystalline aluminosilicates) contain significant amounts of alkali metals, usually sodium. Many applications of said zeolites require the removal of nearly all the sodium and its replacement with ammonium ions. Many zeolite modifications such as stabilization also require removal of nearly all the sodium. Some zeolites including the faujasites have structures that impede the exchange of ammonium ion for sodium, especially when more than 70 to 80% of the sodium they contain is to be exchanged. Prior art methods include exhaustive ion exchange processes with solutions of high concentrations of ammonium salts. See Example IX of U.S. Pat. No. 3,449,020. An alternative process involves the steam calcination of an ammonium zeolite Y that still contains 2.5 to 5% $Na_2O$ followed by an additional exchange with an ammonium salt solution. See U.S. Pat. No. 3,929,672 among others. This process is not always desirable, as some of the properties of the zeolite are changed and the hydrogen form of the zeolite is formed upon steam calcination. Not all zeolites of the faujasite structure are stable in the hydrogen form. U.S. Pat. No. 4,058,484 discloses a method for providing an ammonium zeolite which involves ion exchange with at least 20 equivalents of ammonium ions for each equivalent of sodium in the zeolite. The temperatures required for the exchange are very high, being in excess of 300° F.

It is an object of this invention to provide ammonium zeolite X or ammonium zeolite Y by a method that does not involve temperatures above boiling, the use of ammonium salt solutions of high concentrations, and/or high ammonium ion to zeolite contact ratios.

SUMMARY OF THE INVENTION

I have found that ammonium zeolites of faujasite structure such as zeolite X, Y, ZSM-20, ZSM-3 and CSZ-1 with very low alkali metal content can be prepared by a process that includes an initial potassium ion exchange followed by an ammonium ion exchange. The starting zeolite X or Y which can contain sodium (about 11% $Na_2O$ or more) is contacted with a potassium salt solution at a temperature less than boiling. The contact is such that a significant portion of the zeolitic sodium is replaced by potassium. This exchange need not be exhaustive, as only 80 to 90% of the sodium needs to be exchanged. The nearly complete ion exchange of the zeolitic potassium and sodium for ammonium is now attained relatively easily. The extremely low level of alkali metal in the ammonium zeolite is attained at temperatures less than boiling and without numerous exchange steps. Ion exchange solutions of very high concentrations of ammonium salt and high ammonium ion to zeolite contact ratios are not required.

In contrast to the prior art methods that require high temperatures, high contact ratios of $NH_4^+$/zeolite, highly concentrated ammonium salt solutions, numerous contacts, and steam calcinations to remove the most difficult-to-exchange sodium ions, my process's initial potassium exchange surprisingly renders all of the alkali metal ions (sodium and potassium) easily exchanged for ammonium ions, as will be shown in the examples.

THE INVENTION

The zeolites treated by the process of my invention are faujasite-type materials, the most common of which are designated as zeolite X or Y. Such materials are prepared by the hydrothermal treatment of sources of $SiO_2$, $Al_2O_3$ and $Na_2O$ as described in numerous U.S. Patents including U.S. Pat. Nos. 2,882,244 and 3,130,007.

The zeolites produced by the processes disclosed in these patents are represented by the following formula:

$$0.9 \pm 0.2\ Na_2O : Al_2O_3 : X\ SiO_2 : Y\ H_2O$$

wherein X can be about 2 to 6, and Y can be 0 to 9 and have a faujasite structure. The amount of sodium these materials contain depends upon the $SiO_2/Al_2O_3$ ratio. A zeolite Y with a $SiO_2/Al_2O_3$ ratio of 6 contains about 11% $Na_2O$. Faujasites of lower $SiO_2/Al_2O_3$ ratio contain more $Na_2O$. These materials are articles of commerce and are available as powders and agglomerates.

The zeolite is contacted with a potassium salt solution using conditions that produce zeolites wherein at least about 80% of the sodium for zeolite X and at least about 90% of the sodium for zeolite Y is replaced with potassium. The contacting solution can contain one or more potassium salts of strong acids. These can include among others KCl, $K_2SO_4$, $KNO_3$. The concentration can be 1 to 10 normal. The contact time can be 0.5 to 5 hours. The temperature is below boiling, but is usually above room temperature. The number of contacts can be varied, but not more than 5 are needed. Usually 1, 2 or 3 contacts are all that are required. After contact or between contacts the zeolite is filtered and washed.

The potassium exchanged zeolite contains sufficient potassium to facilitate the nearly complete exchange of ammonium ion for the sodium and potassium in the zeolite. For zeolite X which has 2.0 to 2.5 moles of $SiO_2$ for each mole of $Al_2O_3$ about 84% of the sodium must be exchanged for potassium. For zeolite Y, which has about 3 to 6 moles of $SiO_2$ for each mole of $Al_2O_3$, about 90% of the sodium must be exchanged for potassium. To obtain the potassium content required, the starting zeolite should be contacted with up to 10 moles of potassium ion for each mole of sodium to be exchanged. The potassium level can be more than the minimum required to facilitate the ammonium exchange but no additional process advantages are realized.

The predominately potassium substituted zeolite X or Y is now contacted with a solution of one or more ammonium salts. The salts of strong mineral or organic acids are all useful, and examples include $NH_4Cl$, $(NH_4)_2SO_4$ and $NH_4NO_3$. The concentration of the solution can be 1 to 10 normal and is usually considerably less than about 10 normal. The contact time can vary considerably but is usually 0.5 to 24 hours. The temperature of the exchange is 100° C. or less. Several contacts can be used, but we prefer 2 or 3 contacts. For example, using zeolite Y a 3 stage counter-current contact of a total of 7 moles of $NH_4^+$ ion for each mole of $M^+$ would provide a 97% replacement of $M^+$, where $M=[Na^+ +K^+]$.

An alternative method of carrying out the process of my invention involves the contact of a zeolite such as zeolite X, zeolite Y, zeolite ZSM-20, or zeolite CSZ-1 to a solution containing both ammonium and potassium salts under conditions to produce the desired replacement of sodium by either potassium or ammonium ions. Then the ammonium, potassium exchanged zeolite is contacted with a solution containing an ammonium salt. This alternative method results in saving potassium salt values.

The products of this ion exchange process are faujasite-type zeolites wherein the properties of the zeolites are not changed very much except that the alkali metal content is well below about 0.8% calculated as $Na_2O$, and usually well below about 0.5%. I prefer materials that contain less than 0.15% alkali metal calculated as $Na_2O$. These products can be used in various sorption and catalyst applications. They are also useful as starting materials for stabilization and dealumination processes.

EXAMPLES

The following examples illustrate certain embodiments of my invention. These examples are not provided to establish the scope of the invention, which is described in the disclosure and recited in the claims. The proportions are in parts by weight (pbw), percent by weight (wt %), moles or equivalents. In the tables summarizing the results, $Na_2O/Al_2O_3$ represents the equivalents of Na for each equivalent of Al in the zeolite, $K_2O/Al_2O_3$ represents the equivalents of K for each equivalent of Al, $Na_2O+K_2O$ represents the equivalents of $Na+K$ for each equivalent of Al and M or $M_2O$ represents $Na+K$ or $Na_2O+K_2O$ respectively.

Examples 1 through 8 were carried out with a starting zeolite Y with 5.5 moles of $SiO_2$ for each mole of $Al_2O_3$. This material (a commercial product) will be designated NaY or NaY zeolite. The intermediate products of the potassium exchanges are designated KY or KY zeolite even though they still contain some sodium. The product of the ammonium exchange is designated $NH_4Y$ or $NH_4Y$ zeolite.

Examples 9 through 17 were carried out with a low silica form of zeolite X ($SiO_2/Al_2O_3 = 2$) which is represented herein as LSX. This material was synthesized by the method described by Kühl, Zeolites 1987 Vol. 7, "Crystallization of Low Silica Faujasite ($SiO_2/Al_2O_3 = 2$)." This synthesis is carried out using a mixed alkali of sodium and potassium. This product was my starting material and is designated "NaK LSX" or "NaK LSX zeolite." The intermediate products of the potassium exchange are designated "K LSX" or "K LSX zeolite", even though they still contain some sodium. The product of the ammonium exchange is designated "$NH_4$ LSX" or "$NH_4$ LSX zeolite."

EXAMPLE 1 (Comparative example)

NaY zeolite ($SiO_2/Al_2O_3 = 5.5$) was contacted with various quantities of 3N $NH_4NO_3$ solution for 24 hours at 180° F. The ion exchange contact ratios and residual $Na_2O$ levels are shown in Table 1. The zeolite was washed with 15 pbw hot deionized (DI) $H_2O$ after each ion exchange contact.

TABLE 1

| Meq $NH_4^+$ | 0 | 8.4 | 12.5 | 37.5 | 125 | 375 | 1250 |
|---|---|---|---|---|---|---|---|

TABLE 1-continued

| gm zeolite | | | | | | | |
|---|---|---|---|---|---|---|---|
| Wt % $Na_2O$ (anhydrous) | 13.99 | 6.07 | 5.42 | 4.38 | 3.23 | 1.96 | 1.42 |
| $Na_2O$ (final)/$Na_2O$ Initial | 1.0 | 0.43 | 0.38 | 0.31 | 0.23 | 0.14 | 0.10 |

These results show that very high ammonia to zeolite contact ratios carried out according to the prior art provide products that still have substantial alkali metal content.

EXAMPLE 2 (Preparing KY Zeolite)

KY zeolite was prepared by contacting NaY zeolite ($SiO_2/Al_2O_3=5.5$) with 5 pbw of KCl per pbw of NaY zeolite at 150° F. for 2 hours using 2N KCl solution. After the $K^+$ exchange the zeolite was washed with 5 pbw hot DI $H_2O$. The ion exchange contact was repeated twice. The properties after the third contact are shown in Table 2.

TABLE 2

|  | NaY Starting | KY |
|---|---|---|
| $SiO_2/Al_2O_3$ | 5.5 | 5.5 |
| Wt % $Na_2O$ | 13.9 | 0.59 |
| Wt % $K_2O$ | — | 17.03 |
| $K_2O/Al_2O_3$ | — | 0.95 |
| $Na_2O/Al_2O_3$ | — | 0.05 |
| Lattice Parameter (Å) | — | 24.73 |

These results indicate that potassium ion exchanges readily for sodium ion in NaY.

EXAMPLE 3 (Converting KY Zeolite to $NH_4Y$ Zeolite)

KY zeolite prepared as described in Example 2 was contacted with various quantities of 3N $NH_4Cl$ solution for 24 hours at 100° C. The ion exchange contact ratios and residual $Na_2O$ and $K_2O$ levels are shown in Table 3.

TABLE 3

| Meq $NH_4^+$/gm | 0 | 8 | 40 | 100 | 400 | 1667 |
|---|---|---|---|---|---|---|
| Wt % $Na_2O$ (anhydrous) | 0.59 | 0.03 | 0.01 | 0.01 | 0.01 | 0.01 |
| Wt % $K_2O$ (anhydrous) | 17.03 | 10.37 | 4.19 | 1.73 | 0.58 | 0.19 |
| $K_2O/Al_2O_3$ | 0.95 | 0.56 | 0.22 | 0.09 | 0.03 | 0.01 |
| $Na_2O/Al_2O_3$ | 0.05 | 0.00 | 0.00 | 0.00 | 0.00 | 0.00 |
| $M_2O$ (Final)/$M_2O$ (Initial) | 1.0 | 0.61 | 0.25 | 0.11 | 0.03 | 0.01 |

These results, when compared with the results in Table 1, show how the process of my invention allows the removal of nearly all the alkali metal in zeolite Y. Sodium is completely removed.

EXAMPLE 4 (Comparative Example)

NaY zeolite (13.3% $Na_2O$) was repeatedly contacted with $NH_4NO_3$ solution. Between each ion exchange contact the zeolite was washed with 15 pbw DI $H_2O$. The contact conditions and characterization results are shown in Table 4.

TABLE 4

| Contact | 1 | 2 | 3 | 4 | 5 |
|---|---|---|---|---|---|
| Meq $NH_4^+$/gm | — | 44 | 44 | 44 | 62.5 | 62.5 |
| Contact Temperature (°F.) | — | 180 | 180 | 180 | 180 | 180 |

TABLE 4-continued

| Contact | 1 | 2 | 3 | 4 | 5 |
|---|---|---|---|---|---|
| Contact Time (hr) | — | 3 | 3 | 5 | 5 | 5 |
| Wt % $Na_2O$ | 13.3 | 4.03 | 1.24 | 1.09 | 0.57 | 0.17 |
| $Na_2O/Al_2O_3$ | 1.0 | 0.30 | 0.09 | 0.08 | 0.04 | 0.01 |

These results show how difficult it is to remove nearly all of the sodium from NaY using prior art conventional ion exchange methods.

EXAMPLE 5 (Converting KY Zeolite to $NH_4Y$ Zeolite)

KY prepared as described in Example 2 was contacted with $NH_4Cl$ solution three times at 180° F. for 2 hours each contact. The zeolite was washed with 15 pbw DI $H_2O$ in each interval between contacts. The contact conditions and residual $Na_2O$ and $K_2O$ levels are shown in Table 5.

TABLE 5

| Contact | | 1 | 2 | 3 |
|---|---|---|---|---|
| Meq $NH_4^+$/gm | 0 | 44 | 44 | 44 |
| Wt % $Na_2O$ | 0.59 | 0.01 | 0.01 | 0.01 |
| Wt % $K_2O$ | 17.03 | 4.01 | 0.68 | 0.18 |
| $Na_2O/Al_2O_3$ | 0.05 | 0 | 0 | 0 |
| $K_2O/Al_2O_3$ | 0.95 | 0.21 | 0.03 | 0.01 |
| $Na_2O + K_2O/Al_2O_3$ | 1.0 | 0.21 | 0.03 | 0.01 |

These results also show the advantages of my process in the number of ion exchange contacts and the amount of ammonium salt required to achieve the desired low levels of Na and K remaining in the zeolite is reduced.

EXAMPLES 6 AND 6a (Preparing KY Zeolite Outside Invention Limits)

KY zeolites with higher levels of residual $Na_2O$ were prepared by contacting NaY zeolite with 2N KCl solution. The contact conditions and residual $Na_2O$ and $K_2O$ levels are shown in Table 6.

TABLE 6

| | Example 2 | Example 6 | Example 6a |
|---|---|---|---|
| Meq $K^+$/gm NaY zeolite | — | 20 | 40 |
| Contact Temperature (°F.) | — | 180 | 180 |
| Contact Time (hr) | — | 2 | 2 |
| Wt % $Na_2O$ (anhydrous) | 0.59 | 2.20 | 1.19 |
| Wt % $K_2O$ (anhydrous) | 17.03 | 14.80 | 16.18 |
| $K_2O/Al_2O_3$ | 0.95 | 0.82 | 0.90 |
| $Na_2O/Al_2O_3$ | 0.05 | 0.18 | 0.10 |

EXAMPLE 7 (Converting KY Zeolite to $NH_4Y$ Zeolite Outside Invention Limits)

KY from Example 6 ($K_2O/Al_2O_3=0.82$) was contacted with various quantities of $NH_4Cl$ solution for 24 hours at 100° C. The ion exchange contact conditions and residual $Na_2O$ and $K_2O$ levels are shown in Table 7.

TABLE 7

| Meq $NH_4^+$/gm KY | 0 | 40 | 100 | 400 | 1746 |
|---|---|---|---|---|---|
| Wt % $Na_2O$ (anhy) | 2.20 | 1.81 | 1.46 | 0.99 | 0.53 |
| Wt % $K_2O$ (anhy) | 14.80 | 3.78 | 2.32 | 0.69 | 0.11 |
| $Na_2O/Al_2O_3$ | 0.18 | 0.19 | 0.16 | 0.11 | 0.05 |
| $K_2O/Al_2O_3$ | 0.82 | 0.26 | 0.17 | 0.05 | 0.01 |
| $Na_2O + K_2O/Al_2O_3$ | 1.00 | 0.45 | 0.33 | 0.16 | 0.06 |

These results show that a KY zeolite that still retains 0.18 $Na_2O/Al_2O_3$ does not provide the advantages of my process. These results should be compared with those in Table 3.

EXAMPLE 8 (Converting KY Zeolite to $NH_4Y$ Zeolite)

KY from Example 6a ($K_2O/Al_2O_3=0.90$) was contacted with various quantities of $NH_4Cl$ solution for 24 hours at 100° C. The ion-exchange contact conditions and residual $Na_2O$ and $K_2O$ levels are shown in Table 8.

TABLE 8

| Meq $NH_4^+$/gm KY | 0 | 40 | 100 | 400 | 1667 |
|---|---|---|---|---|---|
| Wt % $Na_2O$ (anhy) | 1.19 | 0.03 | 0.02 | 0.02 | 0.02 |
| Wt % $K_2O$ (anhy) | 16.18 | 4.23 | 1.76 | 0.64 | 0.23 |
| $Na_2O/Al_2O_3$ | 0.10 | 0 | 0 | 0 | 0 |
| $K_2O/Al_2O_3$ | 0.90 | 0.23 | 0.10 | 0.03 | 0.01 |
| $Na_2O + K_2O/Al_2O_3$ | 1.00 | 0.23 | 0.10 | 0.03 | 0.01 |

These results, combined with those of Examples 1 and 8, show that more than 82% of the available ion exchange sites must be in the potassium form to provide the advantages of my process.

EXAMPLE 9 (Comparative Example)

NaK LSX was contacted with various quantities of $NH_4NO_3$ solution for 6 hours at 195° F. The ion-exchange contact ratios and residual $Na_2O$ and $K_2O$ levels are shown in Table 9.

TABLE 9

| Meq $NH_4^+$/gm NaKLSX powder | 0 | 12 | 24 | 48 | 96 | 192 | 384 | 1624 |
|---|---|---|---|---|---|---|---|---|
| Wt % $Na_2O$ (anhydrous) | 15.9 | 10.50 | 9.76 | 8.64 | 7.79 | 7.10 | 5.92 | 0.69 |
| Wt % $K_2O$ (anhydrous) | 8.1 | 1.90 | 1.23 | 0.71 | 0.46 | 0.31 | 0.22 | 0.11 |
| $K_2O/Al_2O_3$ | 0.25 | 0.06 | 0.03 | 0.02 | 0.01 | 0.01 | 0.01 | 0.01 |
| $Na_2O/Al_2O_3$ | 0.75 | 0.46 | 0.42 | 0.36 | 0.32 | 0.29 | 0.24 | 0.03 |
| $Na_2O + K_2O/Al_2O_3$ | 1.00 | 0.52 | 0.45 | 0.38 | 0.33 | 0.30 | 0.25 | 0.04 |

These results indicate that severe conditions are required to prepare $NH_4LSX$ of very low alkali metal content by conventional prior art ion exchange processes.

EXAMPLE 10 (Preparing K LSX)

K LSX was prepared by contacting NaK LSX ($Na_2O/Al_2O_3=0.75$) with 3 pbw of KCl per pbw of NaK LSX zeolite at 160° F. for 2 hours using 3N KCl. After the $K^+$ exchange, the zeolite was washed with 5 pbw hot DI $H_2O$. The ion exchange contact was repeated three times. The properties after the fourth contact are shown in Table 10.

TABLE 10

| $SiO_2/Al_2O_3$ | 2.0 |
|---|---|
| Wt % $Na_2O$ | 0.03 |
| Wt % $K_2O$ | 29.72 |

TABLE 10-continued

| | |
|---|---|
| $K_2O/Al_2O_3$ | 1.00 |
| $Na_2O/Al_2O_3$ | 0 |

EXAMPLE 11 (Converting K LSX to $NH_4$ LSX)

K LSX zeolite prepared as described in Example 10 was contacted with various quantities of $NH_4NO_3$ solution for 6 hours at 160° F. The ion exchange contact ratios and residual $Na_2O$ and $K_2O$ levels are shown in Table 11.

TABLE 11

| Meq $NH_4^+$/gm zeolite | 0 | 26 | 52 | 130 | 260 | 1040 |
|---|---|---|---|---|---|---|
| Wt % $Na_2O$ | 0.03 | 0.02 | 0.01 | 0.01 | 0.02 | 0.01 |
| Wt % $K_2O$ | 29.72 | 10.10 | 7.26 | 5.57 | 3.45 | 0.76 |
| $K_2O/Al_2O_3$ | 1.00 | 0.28 | 0.19 | 0.15 | 0.09 | 0.02 |
| $Na_2O/Al_2O_3$ | 0 | 0 | 0 | 0 | 0 | 0 |
| $Na_2O + K_2O/Al_2O_3$ | 1.00 | 0.28 | 0.19 | 0.15 | 0.09 | 0.02 |

After $NH_4^+$ ion exchange, the residual $K_2O + Na_2O/Al_2O_3$ ratio is much lower when starting with K LSX than when starting with NaK LSX.

EXAMPLE 12 (Comparative Example)

NaK LSX was contacted repeatedly with $NH_4Cl$ solution. The zeolite was washed with 15 pbw DI $H_2O$ after each contact. After four contacts the $NH_4$NaK LSX was analyzed for residual $Na_2O$ and $K_2O$. A summary of the contact conditions and residual $Na_2O$ and $K_2O$ is shown in Table 12.

TABLE 12

| | | |
|---|---|---|
| Meq $NH_4^+$/gm NaK LSX/contact | 0 | 75 |
| Number of Crossflow Contacts | 0 | 4 |
| Contact Temperature (°F.) | 0 | 160 |
| Contact Time (hr) | 0 | 2 |
| Wt % $Na_2O$ (anhydrous) | 15.9 | 3.45 |
| Wt % $K_2O$ (anhydrous) | 8.1 | 0.01 |
| $K_2O/Al_2O_3$ | 0.25 | 0 |
| $Na_2O/Al_2O_3$ | 0.75 | 0.13 |
| $Na_2O + K_2O/Al_2O_3$ | 1.00 | 0.13 |

These results further illustrate that even very exhaustive prior art ion exchange processes do not provide $NH_4$ LSX of very low alkali metal content.

EXAMPLE 13 (Converting K LSX to $NH_4$ LSX)

K LSX, prepared as described in Example 10, was contacted with $NH_4Cl$ solution three times at 160° F. for 2 hours each contact. The zeolite was washed with 15 pbw DI $H_2O$ between each contact. The contact conditions and residual $K_2O$ level after the third contact are shown in Table 13.

TABLE 13

| | | |
|---|---|---|
| Meq $NH_4^+$/gm/contact | 0 | 28 |
| Number of Contacts | 0 | 3 |
| Wt % $K_2O$ (anhydrous) | 29.72 | 1.96 |
| $K_2O/Al_2O_3$ | 1.00 | 0.05 |

These results illustrate the advantages of my invention, especially when compared to the results of Example 12 summarized in Table 12.

EXAMPLES 14 AND 14a (Preparing K LSX Outside Invention Limits)

K LSX with varying levels of residual $Na_2O$ were prepared by contacting NaK LSX ($Na_2O/Al_2O_3=0.75$) with 3N KCl solution. The contact conditions and residual $Na_2O$ and $K_2O$ levels are shown in Table 14.

TABLE 14

| | | Example 14 | Example 14a |
|---|---|---|---|
| Meq $NH_4^+$/gm NaKLSX | 0 | 13 | 53 |
| Temperature (°F.) | — | 180 | 180 |
| Contact Time (hr) | — | 2 | 2 |
| Wt % $Na_2O$ (anhydrous) | 15.9 | 12.53 | 3.19 |
| Wt % $K_2O$ (anhydrous) | 8.1 | 12.67 | 25.40 |
| $Na_2O/Al_2O_3$ | 0.75 | 0.40 | 0.16 |
| $K_2O/Al_2O_3$ | 0.25 | 0.60 | 0.84 |
| $Na_2O + K_2O/Al_2O_3$ | 1.00 | 1.00 | 1.00 |

EXAMPLE 15 (Converting K LSX to $NH_4$ LSX Outside Invention Limits)

K LSX ($K_2O/Al_2O_3=0.84$) prepared as described in Example 14a was contacted with various quantities of 4N $NH_4Cl$ solution for 24 hours at 180° F. The ion-exchange conditions and residual $Na_2O$ and $K_2O$ levels are shown in Table 15.

TABLE 15

| Meq $NH_4^+$/gm KNa LSX | 0 | 40 | 160 | 400 | 800 |
|---|---|---|---|---|---|
| Wt % $Na_2O$ (anhydrous) | 3.19 | 1.32 | 0.66 | 0.22 | 0.06 |
| Wt % $K_2O$ (anhydrous) | 25.40 | 5.01 | 3.34 | 1.33 | 0.53 |
| $Na_2O/Al_2O_3$ | 0.16 | 0.06 | 0.03 | 0.01 | — |
| $K_2O/Al_2O_3$ | 0.84 | 0.15 | 0.10 | 0.04 | 0.02 |
| $Na_2O + K_2O/Al_2O_3$ | 1.00 | 0.21 | 0.13 | 0.05 | 0.02 |

These results indicate that the advantages of my process are realized when the K LSX still retains 0.16 $Na_2O/Al_2O_3$. Compare these results with Example 11 and Table 11.

EXAMPLE 16 (Converting K LSX to $NH_4$ LSX Outside Invention Limits)

K LSX ($K_2O/Al_2O_3=0.60$) prepared as described in Example 14 was contacted with various quantities of 4N $NH_4Cl$ solution for 24 hours at 180° F. Ion-exchange conditions and residual $Na_2O$ and $K_2O$ levels are shown in Table 16.

TABLE 16

| Meq $NH_4^+$1 (gm KNa LSX) | 0 | 40 | 160 | 400 | 800 |
|---|---|---|---|---|---|
| Wt % $Na_2O$ (anhydrous) | 12.53 | 6.18 | 4.63 | 4.40 | 0.44 |
| Wt % $K_2O$ (anhydrous) | 12.67 | 1.67 | 1.00 | 0.67 | 0.65 |
| $Na_2O/Al_2O_3$ | 0.40 | 0.28 | 0.21 | 0.20 | 0.02 |
| $K_2O/Al_2O_3$ | 0.60 | 0.05 | 0.03 | 0.02 | 0.02 |
| $Na_2O + K_2O/Al_2O_3$ | 1.00 | 0.33 | 0.24 | 0.22 | 0.04 |

These results indicate that the advantages of my process are not fully realized when the K LSX still retains sufficient sodium to provide 0.60 $Na_2O/Al_2O_3$.

I claim:

1. A process for preparing an ammonium zeolite of extremely low alkali metal content comprising the steps of:
   a. contacting a starting sodium-containing zeolite of the faujasite structure selected from the group consisting of zeolite X, zeolite Y, zeolite ZSM-20, zeolite ZSM-3 and zeolite CSZ-1 with a solution that contains a potassium salt and an ammonium salt under ion-exchange conditions that provide exchange of the sodium for potassium or ammonium to result in a residual sodium content of 0.1 equivalent of $Na_2O$ or less for each equivalent of $Al_2O_3$;

b. filtering and washing the resulting potassium, ammonium exchanged zeolite;

c. contacting said potassium, ammonium exchanged zeolite with a solution of an ammonium salt under ion-exchange conditions such that ammonium ions replace sodium and potassium in the zeolite to produce an ammonium zeolite having the same structure as the starting zeolite that contains less than 0.1 equivalent of $Na_2O+K_2O$ for each equivalent of $Al_2O_3$; and d. filtering and washing the resulting zeolite product.

* * * * *